(12) United States Patent
Flint et al.

(10) Patent No.: US 11,969,627 B2
(45) Date of Patent: Apr. 30, 2024

(54) EXERCISE APPARATUS AND METHOD

(71) Applicant: WLF INNOVATIONS LTD, Solihull (GB)

(72) Inventors: William Flint, Birmingham (GB); Lewis Critchlow, Birmingham (GB)

(73) Assignee: WLF INNOVATIONS LTD. (GB)

( * ) Notice: Subject to any disclaimer, the term of this patent is extended or adjusted under 35 U.S.C. 154(b) by 0 days.

(21) Appl. No.: 18/269,309

(22) PCT Filed: Dec. 24, 2021

(86) PCT No.: PCT/GB2021/053438
§ 371 (c)(1),
(2) Date: Jun. 23, 2023

(87) PCT Pub. No.: WO2022/136890
PCT Pub. Date: Jun. 30, 2022

(65) Prior Publication Data
US 2023/0390607 A1 Dec. 7, 2023

(30) Foreign Application Priority Data

Dec. 24, 2020 (GB) ...................................... 2020630

(51) Int. Cl.
*A63B 24/00* (2006.01)
*H02K 7/18* (2006.01)
*A63B 71/06* (2006.01)

(52) U.S. Cl.
CPC ....... *A63B 24/0087* (2013.01); *H02K 7/1861* (2013.01); *A63B 2024/0068* (2013.01);
(Continued)

(58) Field of Classification Search
CPC ........ A63B 24/0087; A63B 2024/0068; A63B 2024/0078; A63B 2024/0093;
(Continued)

(56) References Cited

U.S. PATENT DOCUMENTS 4,298,893 A * 11/1981 Holmes .............. A63B 22/0605
348/730
5,616,104 A 4/1997 Mulenburg
(Continued)

FOREIGN PATENT DOCUMENTS

AU 2011100757 A4 9/2011
CN 20266289 U 1/2013
(Continued)

*Primary Examiner* — Joshua Lee
(74) *Attorney, Agent, or Firm* — DINSMORE & SHOHL LLP

(57) ABSTRACT

An exercise apparatus includes: an electrical generator which is configured to be driven by user effort; an electrical output port configured to electrically connect to an electrical storage device or an inverter; and an electrical resistive load. An electrical energy conversion unit has an input connected to the electrical generator and is configured to receive electrical energy from the electrical generator. The electrical energy conversion unit has a first output connected to the electrical output port and a second output connected to the electrical load. A controller is configured to receive an input selection of a required exercise resistance and to determine a first output voltage/current for the first output of the electrical energy conversion unit and a second output voltage/current for the second output of the electrical energy conversion unit to provide the required exercise resistance.

22 Claims, 8 Drawing Sheets

(52) U.S. Cl.
CPC ............... *A63B 2024/0078* (2013.01); *A63B 2024/0093* (2013.01); *A63B 2071/0675* (2013.01); *A63B 2220/30* (2013.01); *A63B 2225/50* (2013.01); *A63B 2230/755* (2013.01)

(58) Field of Classification Search
CPC ........ A63B 2071/0675; A63B 2220/30; A63B 2225/50; A63B 2230/755; H02K 7/1861
See application file for complete search history.

(56) References Cited

U.S. PATENT DOCUMENTS

| | | | |
|---|---|---|---|
| 6,987,327 B1* | 1/2006 | Lucatero | B62J 6/08 74/625 |
| 7,066,865 B2 | 6/2006 | Radow | |
| 7,094,184 B1* | 8/2006 | Chen | A63B 21/0053 73/379.06 |
| 7,129,592 B1* | 10/2006 | Yetter | F03G 5/06 290/1 R |
| 7,608,015 B2 | 10/2009 | Radow | |
| 7,841,964 B2 | 11/2010 | Radow | |
| 7,862,476 B2 | 1/2011 | Radow | |
| 8,485,944 B2* | 7/2013 | Drazan | H02J 3/381 482/1 |
| 8,888,660 B1* | 11/2014 | Oteman | A63B 23/03533 482/901 |
| 8,894,547 B2* | 11/2014 | Bruno | A63B 23/1209 482/901 |
| 9,126,076 B2* | 9/2015 | Liang | H02K 7/1861 |
| 9,283,421 B2* | 3/2016 | Duval | A63B 21/0058 |
| 9,692,276 B2* | 6/2017 | Oteman | A63B 21/0054 |
| 9,737,746 B2* | 8/2017 | Sutkowski | F03G 5/064 |
| 9,764,178 B1* | 9/2017 | Wein | A63B 21/0055 |
| 9,943,718 B2* | 4/2018 | Sutkowski | H02P 9/04 |
| 11,278,761 B2* | 3/2022 | Schaefer | A63B 24/0075 |
| 11,456,623 B2* | 9/2022 | Lagree | A63B 22/0089 |
| 2009/0054207 A1* | 2/2009 | Lin | A63B 21/0053 482/2 |
| 2010/0090475 A1 | 4/2010 | Tsai et al. | |
| 2010/0197460 A1 | 8/2010 | Czarnecki | |
| 2011/0009239 A1 | 1/2011 | Whelan, Jr. | |
| 2011/0111922 A1 | 5/2011 | Weinman | |
| 2011/0118086 A1 | 5/2011 | Radow | |
| 2011/0234175 A1* | 9/2011 | Hajee | A63B 22/0605 320/137 |
| 2011/0263384 A1* | 10/2011 | Drazan | A63B 21/0055 482/2 |
| 2012/0238406 A1 | 9/2012 | Beard | |
| 2014/0077494 A1* | 3/2014 | Sutkowski | F03G 5/064 290/7 |
| 2015/0273272 A1 | 10/2015 | Wang | |
| 2017/0128763 A1* | 5/2017 | Sutkowski | F03G 5/06 |
| 2017/0340913 A1* | 11/2017 | Sutkowski | F03G 5/086 |
| 2018/0099178 A1* | 4/2018 | Schaefer | A63B 24/0075 |
| 2018/0280782 A1 | 10/2018 | Lagree | |
| 2019/0358483 A1 | 11/2019 | Fuchs | |
| 2020/0230459 A1* | 7/2020 | Schaefer | G16H 20/30 |
| 2021/0057963 A1* | 2/2021 | Weinberger | H02K 7/1853 |

FOREIGN PATENT DOCUMENTS

| | | |
|---|---|---|
| CN | 202654600 U | 1/2013 |
| CN | 103845862 A | 6/2014 |
| CN | 107694068 A | 2/2018 |
| EP | 1268008 B1 | 11/2007 |
| EP | 2638936 A1 | 9/2013 |
| WO | 2016156590 A1 | 10/2016 |
| WO | 2016172103 A1 | 10/2016 |
| WO | 2018206987 A1 | 11/2018 |
| WO | 2019196997 A1 | 10/2019 |
| WO | 2020068162 A1 | 4/2020 |

\* cited by examiner

EXERCISE APPARATUS AND METHOD

CROSS-REFERENCE TO RELATED APPLICATIONS

This application is the U.S. National Stage of PCT/GB2021/053438 filed on Dec. 24, 2021, which claims priority to United Kingdom Patent Application 2020630.6 filed on Dec. 24, 2020, the entire content of both are incorporated herein by reference in their entirety.

BACKGROUND OF THE INVENTION

Exercise apparatus is widely used in gyms and at homes and can take the form of a bike, a cross-trainer, a rowing machine or other type of apparatus. A user applies human effort to work against an amount of resistance. The level of resistance can be selected by a user, such as by a hand-operated control on a static exercise bike or a rowing machine. Alternatively, the level of resistance can be selected by a computer as part of a computer-controlled workout program. For example, an exercise bike can provide a program which simulates a ride over a hilly terrain. During the course of the program, the computer can apply a variable level of resistance to simulate various gradients.

Many exercise bikes use some form of brake to provide a variable level of resistance to oppose the human effort applied by a user. Some known forms of brake are a magnetic induction brake based on the eddy-current principle (e.g. to induce an eddy current in a flywheel of the bike), and a friction brake (e.g. a strap pressing against the outside of a flywheel).

There is interest in harvesting the useful human effort applied by a user during a workout into electrical energy.

It is an aim of the present invention to address at least one disadvantage associated with the prior art.

SUMMARY OF THE INVENTION

There is provided an exercise apparatus comprising:
an electrical generator which is configured to be driven by user effort;
an electrical output port configured to electrically connect to an electrical storage device or an inverter;
an electrical resistive load;
an electrical energy conversion unit comprising:
i. an input connected to the electrical generator and configured to receive electrical energy from the electrical generator;
ii. a first output connected to the electrical output port; and
iii. a second output connected to the electrical load;
a controller which is configured to:
i. receive an input selection of a required exercise resistance;
ii. determine a first output voltage/current for the first output of the electrical energy conversion unit and a second output voltage/current for the second output of the electrical energy conversion unit to provide the required exercise resistance; and
iii. control operation of the electrical energy conversion unit to output the first output voltage/current and the second output voltage/current.

One way of expressing exercise resistance is as a gradient or incline, measured in %. It will be understood that a required exercise resistance can be expressed in various other ways. A required exercise resistance can be used to determine other parameters, such as power and/or torque Optionally, the controller is configured to operate in three operating modes:
(i) a first operating mode in which input energy from the generator is only output to the first output;
(ii) a second operating mode in which input energy from the generator is output to a combination of the first output and the second output;
(iii) a third operating mode in which input energy from the generator is only output to the second output.

Optionally, the electrical storage device is selectively connectable to the electrical output port and the controller is configured to:
determine when the electrical storage device is connected to the electrical output port; and
when the electrical storage device is not connected to the electrical output port, operate in the third operating mode.

Optionally, the electrical storage device is selectively connectable to the electrical output port while the exercise apparatus is in use.

Optionally, the controller is configured to determine a state of charge of the electrical storage device and to vary the first output voltage/current and the second output voltage/current over time based on a state of charge of the electrical storage device.

Optionally, the controller is configured to selectively control the first output voltage/current according to one of: a constant current charging scheme and a constant voltage charging scheme based on a state of charge of the electrical storage device.

Optionally, the controller is configured to determine a state of charge of the electrical storage device by monitoring battery voltage.

Optionally, the inverter is selectively connectable to the electrical output port and the controller is configured to:
determine when the inverter is connected to the electrical output port; and
when the inverter is not connected to the electrical output port, operate in the third operating mode.

Optionally, the inverter is selectively connectable to the electrical output port while the exercise apparatus is in use.

Optionally, the controller is configured to determine an amount of power required by the inverter and to vary the first output voltage/current and the second output voltage/current over time based on the amount of power required by the inverter.

Optionally, the controller is configured to determine an electrical power corresponding to the exercise resistance.

Optionally, the controller is configured to determine the electrical power corresponding to the exercise resistance, based on a torque.

Optionally, the controller is configured to prioritise transfer of input energy from the generator to the first output.

Optionally, the controller is configured to determine an electrical power corresponding to the exercise resistance based on an input which is indicative of the actual operation of the electrical generator.

Optionally, the input which is indicative of the actual operation of the electrical generator is at least one of:
an output voltage of the generator;
a voltage within the energy conversion unit which is related to an output voltage of the generator;
rotational speed of the generator.

Optionally, the electrical energy conversion unit comprises:
(i) a first converter configured to rectify an alternating current output of the generator to a direct current output at a higher output voltage;
a second converter configured to derive the first output voltage from the dc output voltage of the first converter;
a third converter configured to derive the second output voltage from the dc output voltage of the first converter.

Optionally, the electrical generator is a brushless dc motor which provides a three-phase alternating current supply.

Optionally, the exercise apparatus comprises a user interface and the controller is configured to receive an input selection of exercise resistance from the user interface, or the controller is configured to determine a required exercise resistance from one or more inputs from the user interface.

Optionally, in addition or instead, the exercise apparatus comprises a wireless communications interface and wherein the controller is configured to receive an input selection of exercise resistance from the wireless communications interface, or the controller is configured to determine a required exercise resistance from data received from the wireless communications interface.

Optionally, in addition or instead, the exercise apparatus comprises a wired communications interface such as an ethernet interface, CAN bus interface or any other suitable interface. The controller may be configured to receive an input selection of exercise resistance from the communications interface, or the controller may be configured to determine a required exercise resistance from data received from the communications interface.

Optionally, the controller may be configured to receive energy burned information indicative of an amount of energy a user has expended in a given period of time, optionally during the course of the current day, the controller being further configured to receive target energy burn information indicative of a target amount of energy to be expended by a user in a corresponding period, the controller being configured to calculate a target amount of energy to be burned during a period of exercise using the exercise apparatus. The energy burned information may be received from the user interface of the apparatus, where present, or from a remote device, optionally via the wireless communications interface. The remote device may for example by a smartphone, tablet, laptop computer, desktop computer or any other suitable computing device.

Thus the controller may calculate an amount of energy a user must burn in order to "top up" a user's energy burn (which may be measured, for example in calories or kilojoules).

Optionally, the controller is configured to receive information indicative of the amount of time available to the user to burn the target amount of energy and to generate exercise profile information corresponding to a variation of required exercise resistance provided by the generator as a function of at least one selected from amongst time or effective distance travelled.

The effective distance travelled may be calculated based on an amount of power developed by a user and may for example simulate travel by means of a bicycle, a rowing boat, or travel by foot such as walking, jogging or running.

Optionally, the controller is configured to communicate with a remote device such as a user's smartphone, as noted above, in order to receive the energy burned information and/or the information indicative of the amount of time available.

The exercise apparatus can be in the form of: a bike; a rowing machine; a cross-training machine, a weightlifting apparatus, a treadmill, a skiing cardio machine (for example a machine comprising a pair of levers arranged to be moved by a user, optionally in a manner simulating a skiing experience, in order to drive the generator), a stair climbing machine, an elliptical trainer or an elliptical arm ergometer. It is to be understood that the exercise apparatus may be provided in any suitable form of kinetic cardio or strength workout apparatus in which user movement is employed to drive the generator.

In an aspect of the invention there is provided a system comprising:
at least one exercise apparatus according to an aspect of the invention; and
a system controller configured to communicate with the at least one exercise apparatus.

Optionally, the system controller is configured to communicate with the at least one exercise apparatus to provide the input selection of the required exercise resistance.

The system may comprise a plurality of exercise apparatus, the system being configured to provide the input selection of substantially the same exercise resistance to at least two of the plurality of exercise apparatus.

The system may comprise a plurality of exercise apparatus, the system being configured to provide the input selection of a different respective exercise resistance to at least two of the plurality of exercise apparatus.

The system may comprise a common energy storage device or inverter to which the at least one exercise apparatus is connected.

In an aspect of the invention there is provided a system comprising a plurality of exercise apparatus according to an aspect of the invention, wherein each one of the plurality of exercise apparatus is connected to a common energy storage device or inverter.

An aspect provides a method of controlling an exercise apparatus comprising an electrical generator which is configured to be driven by user effort, an electrical output port for electrically connecting to an electrical storage device or an inverter, an electrical resistive load and an electrical energy conversion unit, the method comprising:
(i) receiving an input selection of exercise resistance;
(ii) determining a first output voltage/current for a first output of the electrical energy conversion unit connected to the electrical output port and a second output voltage/current for the electrical resistive load to provide the required exercise resistance; and
(iii) controlling operation of the electrical energy conversion unit to output the first output voltage/current and the second output voltage/current.

In an aspect there is provided a computer program comprising instructions which, when the program is executed by a computer, cause the computer to carry out the method as described herein, and a computer-readable medium having stored thereon the computer program. The functionality described in this document can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

An aspect provides an electrical energy conversion unit for use with an exercise apparatus with an electrical generator and an electrical load, the electrical energy conversion unit comprising:
  (i) an input configured to connect to the electrical generator and configured to receive electrical energy from the electrical generator;
  (ii) a first output connected to an electrical output port which is configured to electrically connect to an electrical storage device or an inverter; and
  (iii) a second output which is configured to electrically connect to an electrical load;
  a controller which is configured to:
  i. receive an input selection of a required exercise resistance;
  ii. determine a first output voltage/current for the first output of the electrical energy conversion unit and a second output voltage/current for the second output of the electrical energy conversion unit to provide the required exercise resistance; and
  iii. control operation of the electrical energy conversion unit to output the first output voltage/current and the second output voltage/current.

An advantage of at least one example or embodiment is that a user experiences a level of exercise resistance (or torque) which is more consistently matched to a required exercise resistance. This improves the user experience during an exercise session while the exercise apparatus performs useful recovery, or harvesting, of user effort into electrical energy.

An advantage of at least one example or embodiment is that the exercise apparatus can recover energy from user effort without the need for braking devices.

In an aspect of the present invention there is provided an exercise apparatus comprising:
  an electrical generator which is configured to be driven by user effort; and
  a controller which is configured to:
  i. receive an input selection of a required exercise resistance; and
  ii. control operation of the electrical generator to provide a resistance to being driven by user effort corresponding to the selected input of required exercise resistance.

The apparatus may comprise a user interface, wherein the controller is configured to receive an input selection of exercise resistance from the user interface, or the controller is configured to determine a required exercise resistance from one or more inputs from the user interface.

In addition or instead, the apparatus may comprise a communications interface, optionally a wireless communications interface, and the controller may be configured to receive an input selection of exercise resistance from the communications interface, or the controller may be configured to determine a required exercise resistance from data received from the communications interface.

The controller may receive an input indicative of an amount of energy a user has expended during a particular period such as a day, and a target amount of energy the user wishes to expend. The controller may determine the difference, being a target amount of energy to be expended by the user during an exercise period. The controller may request a user to input information (e.g. via the user interface, where provided, or a remote device such as a smartphone or tablet via the communications interface) indicative of an amount of time within which the target amount of energy to be expended by the user during an exercise period is to be expended, i.e. the length of the exercise period. The controller may then generate a torque resistance profile comprising information indicative of torque resistance as a function of time or effective distance travelled during the exercise period. The effective distance travelled may correspond to a distance a user might travel for a given amount of energy expended. In the case that the exercise apparatus is arranged to simulate cycling, the effective distance may be the distance a user might travel with a similar level of exertion (energy expended in a given amount of time) if the exercise apparatus were a bicycle. It is to be understood that the controller may be configured to request a user to input their weight in order to determine more accurately the effective distance travelled for a given level of exertion. It is to be understood that the apparatus may be configured wherein the different levels of exercise resistance correspond to different effective gear ratios of a bicycle, that is between rotations of pedals of the bicycle and rotations of wheels of the bicycle of a given diameter.

The torque resistance profile may correspond to one of one or more stored, predefined torque resistance profiles that provide a user with a varying level of torque resistance during the course of an exercise period.

Provision of a profile with a varying torque resistance profile as opposed to a substantially constant level or torque resistance has the advantage of enhancing user enjoyment of the apparatus.

The provision of a profile with a varying torque resistance profile as opposed to a substantially constant level or torque resistance has the advantage that may provide a user with a more immersive exercise experience.

In an aspect of the invention there is provided an electrical energy conversion unit for use with an exercise apparatus with an electrical generator and an electrical load, the electrical energy conversion unit comprising:
  (i) an input configured to connect to the electrical generator and configured to receive electrical energy from the electrical generator;
  (ii) a first output connectable to an electrical output port which is configured to electrically connect to an electrical storage device or an inverter; and
  (iii) a second output which is configured to electrically connect to an electrical load;
  a controller which is configured to:
  i. receive an input selection of a required exercise resistance;
  ii. determine a first output voltage/current for the first output of the electrical energy conversion unit and a second output voltage/current for the second output of the electrical energy conversion unit to provide the required exercise resistance; and
  iii. control operation of the electrical energy conversion unit to output the first output voltage/current and the second output voltage/current.

In another aspect of the invention there is provided an electrical energy conversion unit for use with an exercise apparatus with an electrical generator and an electrical load, the electrical energy conversion unit comprising:
(i) an input configured to connect to the electrical generator and configured to receive electrical energy from the electrical generator;
(ii) a first output which is configured to electrically connect to an electrical storage device and/or an inverter; and
(iii) a second output which is configured to electrically connect to an electrical load;
a controller which is configured to:
i. receive an input selection of a required exercise resistance;
ii. determine a first output voltage/current for the first output of the electrical energy conversion unit and a second output voltage/current for the second output of the electrical energy conversion unit to provide the required exercise resistance; and
iii. control operation of the electrical energy conversion unit to output the first output voltage/current and the second output voltage/current.

Some embodiments of the invention may be understood as described herein.

Within the scope of this application it is envisaged that the various aspects, embodiments, examples and alternatives, and in particular the individual features thereof, set out in the preceding paragraphs, in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION OF THE INVENTION

Figure 1:
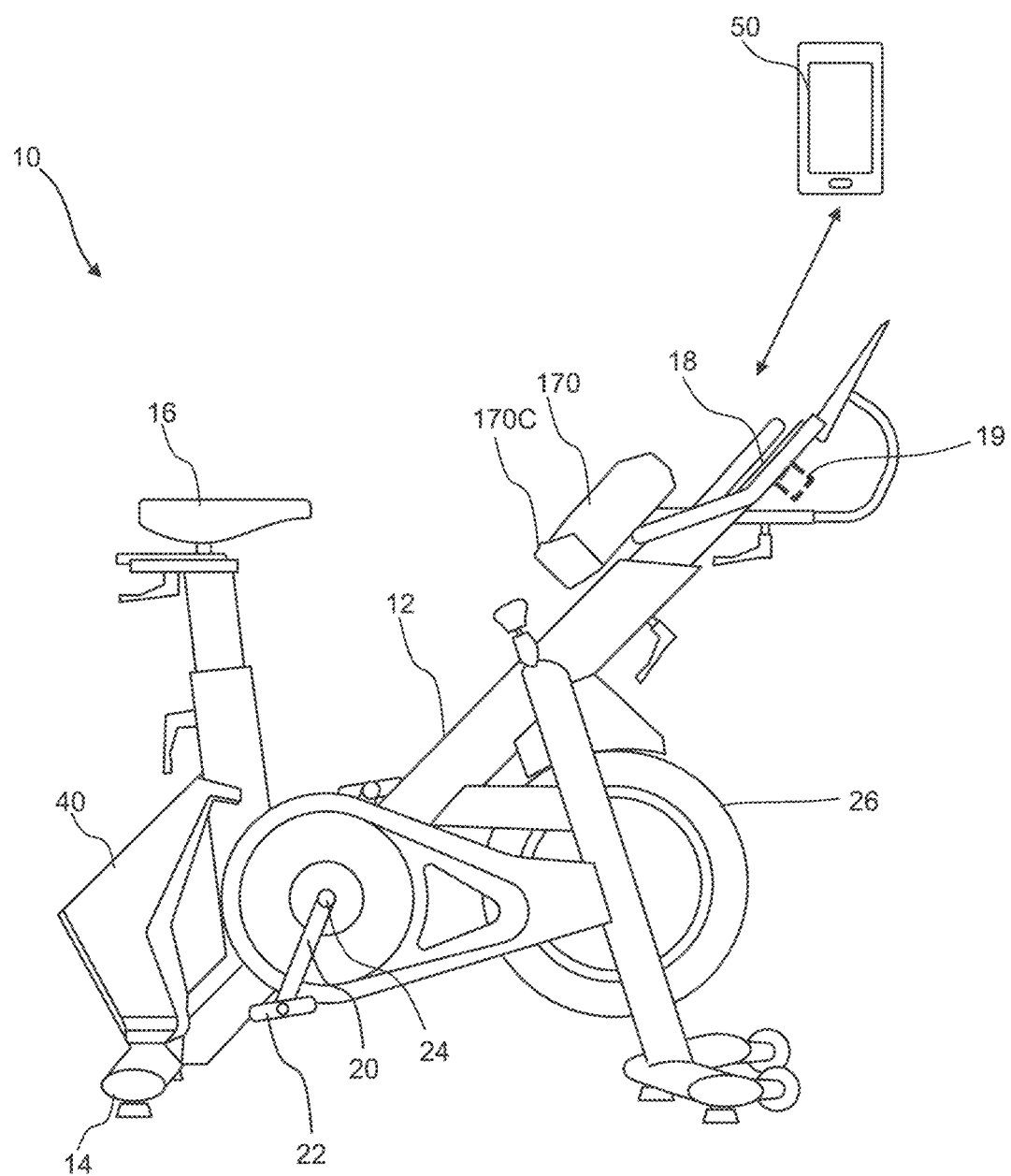
FIG. 1 shows an exercise apparatus in the form of an exercise bike.

FIG. 1 shows an exercise apparatus in the form of an exercise bike 10. The bike 10 has a frame 12 with support members 14 for resting on a floor. The frame 12 supports a seat 16 and handlebars 18 for a user. A pair of crank arms 20 and pedals 22 are connected to a hub 24. In use, a user applies force to the pedals to rotate the crank arms 20 about a rotational axis of the hub 24. The bike 10 also comprises a flywheel (within housing 26) which can be connected to the hub 24 by a belt drive or other form of linkage. The flywheel provides a degree of inertia and helps to simulate the experience of riding an actual bike. The bike 10 comprises an electrical generator (110, FIG. 2). The electrical generator is configured to be driven by user effort. For example there can be a direct, or geared, mechanical linkage between the hub 24 and the generator 110. When the user applies force to the pedals to rotate the crank arms 20 about the rotational axis of the hub 24, energy is transferred via the mechanical linkage to the flywheel. The generator 110 is driven by the flywheel. The generator 110 can be mounted concentrically with a rotational axis of the flywheel. As the flywheel rotates, it rotates a rotor within the generator 110 to generate an electrical supply.

A user interface may be provided on the bike 10. The user interface may comprise a display and user input controls, such as physical levers or buttons 19 (FIG. 1) or virtual buttons displayed on a touch-sensitive display. The levers or buttons 19 are shown in dashed outline in FIG. 1 since they are optional features. In some embodiments the user interface can provide information to a user, such as the number of calories burned, progress through an exercise session, a resistance profile of an exercise session, charge status of an electrical storage device. The user interface can allow the user to turn the bike on/off and adjust operational settings, such as a level of exercise resistance (torque). Another possible type of user input control is a manually-adjustable control knob to set resistance level (torque). A sensor can sense rotation of the control knob to provide a control signal to a controller. Another way of providing control of exercise resistance (torque) is via an external device, such as a mobile phone, tablet or other computing device 50 which can communicate with a communications interface on the bike 10. A cradle or support can be provided on the frame 12 to support the external device 50. In some embodiments, the user interface on the bike 10 can be omitted, and user interface functionality is provided solely by the external device 50.

Figure 2:
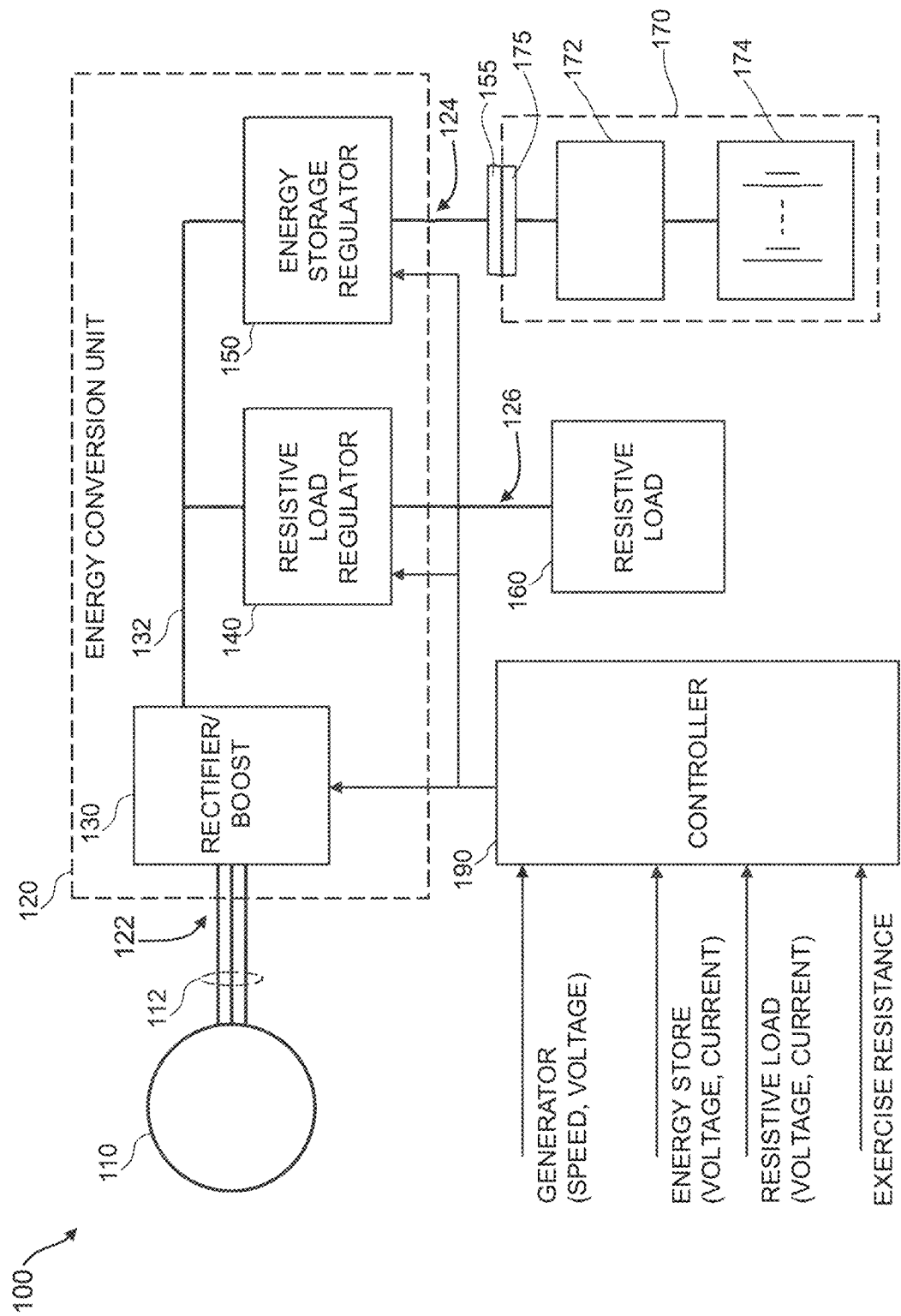
FIG. 2 shows an electrical system for use in the exercise apparatus of FIG. 1.

FIG. 2 shows an overview of the electrical system 100 of the exercise apparatus. The electrical system 100 can be used in the bike of FIG. 1, or some other form of exercise apparatus. The system 100 comprises an electrical generator 110 which is configured to be driven by user effort. An electrical output port 155 is configured to electrically connect to a corresponding port 175 of an electrical storage device 170, such as a battery pack as also shown in FIG. 1. In the present embodiment the electrical storage device 170 is removable from the exercise apparatus. This allows the electrical storage device 170 to be moved to another location and connected to an electrical load elsewhere. The electrical storage device 170 can have a management unit 172 which can perform functions such as balancing charge between individual cells (or groups of cells) 174 and protecting the energy storage device. The system 100 also comprises an electrical load 160. The electrical load 160 can be a resistive load, such as a wire wound resistor.

The system comprises an electrical energy conversion unit 120, which in the illustrated embodiment is provided in unit 40. The electrical energy conversion unit 120 has an input 122 which is connected to the electrical generator 110 and configured to receive electrical energy from the electrical generator 110. The electrical energy conversion unit 120 has a first output 124 connected to the electrical output port 155 and a second output 126 connected to the electrical load 160. A controller 190 controls operation of the electrical system 100. The controller 190 can be wirelessly enabled. The controller 190 is provided in the unit 40 in the embodiment of FIG. 1.

The electrical generator 110 comprises a brushless DC (BLDC) motor which outputs a 3-phase alternating current (AC) supply 112. The electrical energy conversion unit 120 comprises a rectifier and boost (amplification) unit 130. This unit converts the 3-phase supply 112 to a direct current (DC) output at a higher voltage. For example, a 3-phase (max.) 30 VAC peak supply can be converted to an 85 VDC output.

An output of the rectifier/boost unit 130 provides a DC supply on a supply bus 132 to a resistive load regulator 140 and an energy storage regulator 150. The resistive load regulator 140 provides a regulated output voltage and current to the resistive load 160. In use, current passing through the resistive load 160 is dissipated as heat, according to the relationship:

$$\text{Power} = I^2 \cdot R \quad \quad 1.$$

(ii) where: I is the current flowing through the resistive load and R is the resistance of the resistive load.

In the embodiment of FIG. 1 and FIG. 2, the generator 110 outputs 3-phase power to the rectifier/boost unit 130 at a potential of up to around 30 VAC. In turn, the rectifier/boost unit 130 outputs electrical power to the supply bus 132 at a DC potential of up to around 85V. It is to be understood that other values of potential from the generator 110 and supply bus 132 may be useful in some embodiments.

The resistive load regulator 140 is configured to convert the DC supply received via bus 132 to a required output voltage and current to achieve a required power dissipation. The resistive load regulator 140 can be a buck converter, or some other form of DC-to-DC power converter. A duty cycle (i.e. a ratio of "on" time to "off" time) of power switching devices in the converter 140 can be varied to control the output voltage and current. This controls an amount of power dissipated in the resistive load 160.

The energy storage regulator 150 provides a regulated output voltage and current for charging the electrical storage device 170. The energy storage regulator 150 is configured to convert the DC supply received via bus 132 to a required output voltage and current to charge the energy storage device 170. The energy storage regulator 150 can be a buck converter or some other form of DC-to-DC power converter. A duty cycle of power switching devices in the converter 150 can be varied to control output voltage and current. The output voltage/current of the converter 150 is constrained by a charging cycle of the energy storage device 170. During a charging cycle, there are constraints on the voltage and current that can be applied to the energy storage device 170. This, in turn, limits the amount of power that can be dissipated by the energy storage device 170, that is, absorbed by the energy storage device, at a particular point in time, in charging the energy storage device 170. This also affects the load impedance presented by the energy storage regulator 150 and the energy storage device 170, and therefore the load torque seen by the generator.

Figure 3:
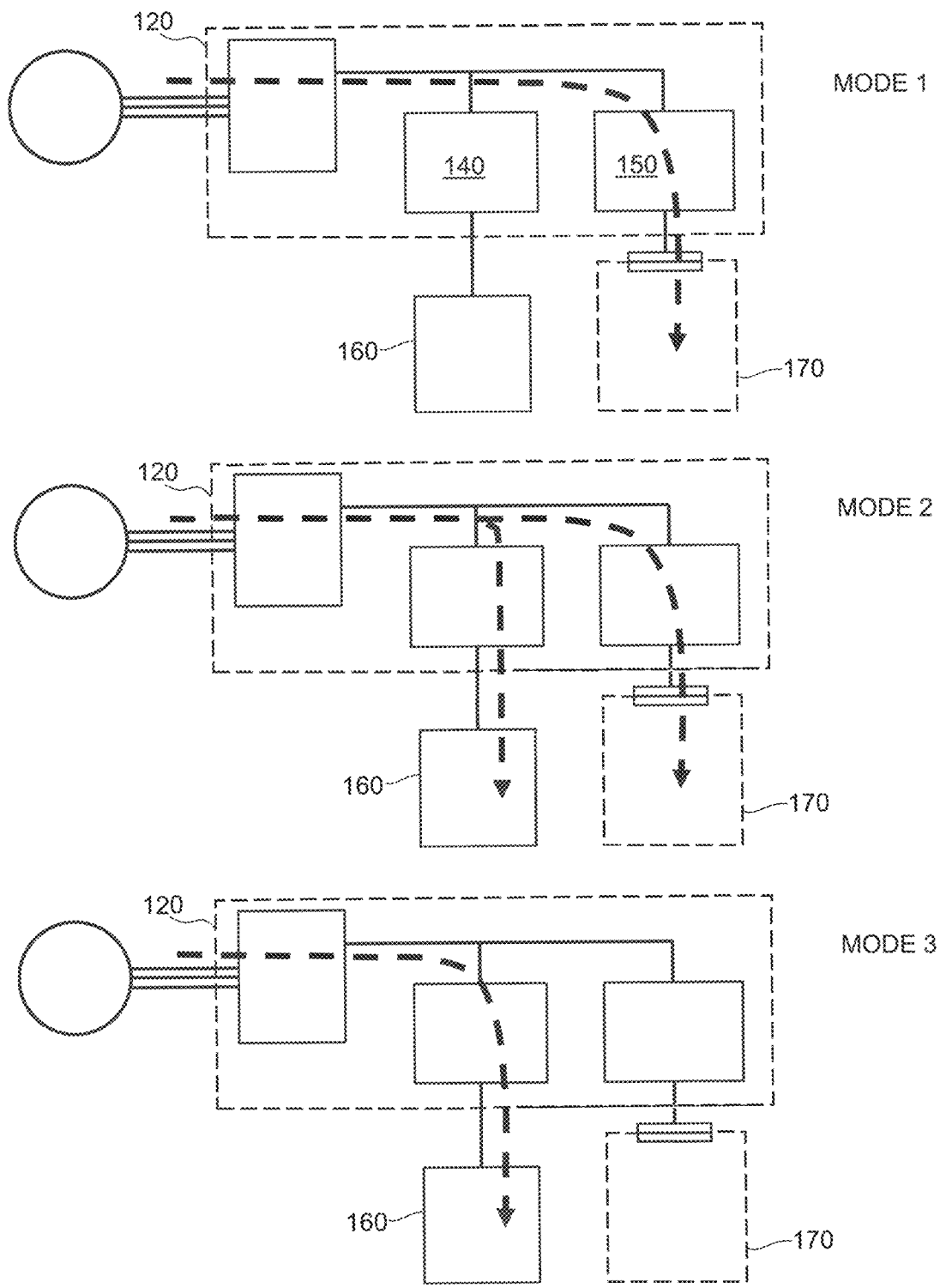
FIG. 3 shows operating modes of the electrical system of FIG. 2.

The electrical system 100 has two electrical loads: (a) the electrical storage device 170; and (b) the resistive load 160. In use, the controller 190 controls: (i) an amount of input electrical energy/power from the generator which is output to charge the electrical storage device 170 and (ii) an amount of input electrical energy/power from the generator which is output to be dissipated as heat in the resistive load 160. The controller 190 controls operation of the electrical energy conversion unit 120 to control the first output voltage/current at output 124 and the second output voltage/current at output 126. FIG. 3 shows three operating modes of the electrical system 100. The controller 190 can operate in:

(i) a first mode (MODE 1) in which input energy from the generator 110 is only output to charge the electrical storage device 170;

(ii) a second mode (MODE 2) in which input energy from the generator 110 is output to a combination of charging the electrical storage device 170 and the resistive load 160;

(iii) a third mode (MODE 3) in which input energy from the generator 110 is only output to the resistive load 160.

The controller 190 can vary the division, or sharing, of the input energy from the generator between outputting energy to charge the electrical storage device 170 and outputting energy to the resistive load 160. The controller can operate so as to prioritise charging of the electrical storage device 170.

FIG. 2 shows some inputs to the controller 190. The inputs include: voltage and current of the energy storage device (e.g. measured at output 124); voltage and current of the resistive load (e.g. measured at output 126); an indication of generator speed, such as: voltage at input 122 (voltage 122 is directly related to speed of rotation of the generator); output voltage of unit 130; an actual speed of rotation of the generator 110 (e.g. measured by a sensor of generator 110 which measures rotation of the rotor of the generator).

Another input to the controller 190 is an indication of a required exercise resistance. This input can be received in various ways, such as: user input from user interface of the exercise apparatus; a value received from a communication device, such as an application executed by a mobile phone, tablet or other computing device; a value received from a controller which is executing an exercise program. The exercise resistance input indicates an amount of exercise resistance that is required at a point in time. This indication of exercise resistance can be mapped to an actual power. For example, a user input of resistance level 5 (selected from a scale of 1-10) may correspond to a power of 500 Watts (W). Controller 190 is configured to determine operational settings for regulators 140, 150 to adjust the load impedance to provide the required level of exercise resistance (torque).

The controller 190 determines operational settings on a regular basis. For example, the controller 190 may determine settings at a frequency of between 10 and 40 times per second. A change in operational settings is required when there is a change in a required value of exercise resistance, such as when a user enters new value of exercise resistance on the user interface. A change in operational settings is required when there is a change in a level of effort that a user is applying to the exercise apparatus. For example, when a user pedals more quickly there is an increase in the input power from the generator and when a user pedals more slowly there is a decrease in the input power from the generator. A change in input power sets a new output power to achieve a required level of exercise resistance. Another reason for changing operational settings is to adjust the voltage/current to the energy storage device. Lithium batteries require particular charging conditions, due to their chemistry. Generally, they accept charge at a slower rate as their state-of-charge increases. Therefore, as the battery fills, there is a need to change the voltage and current that the energy storage regulator provides for charging the battery.

Figure 4:
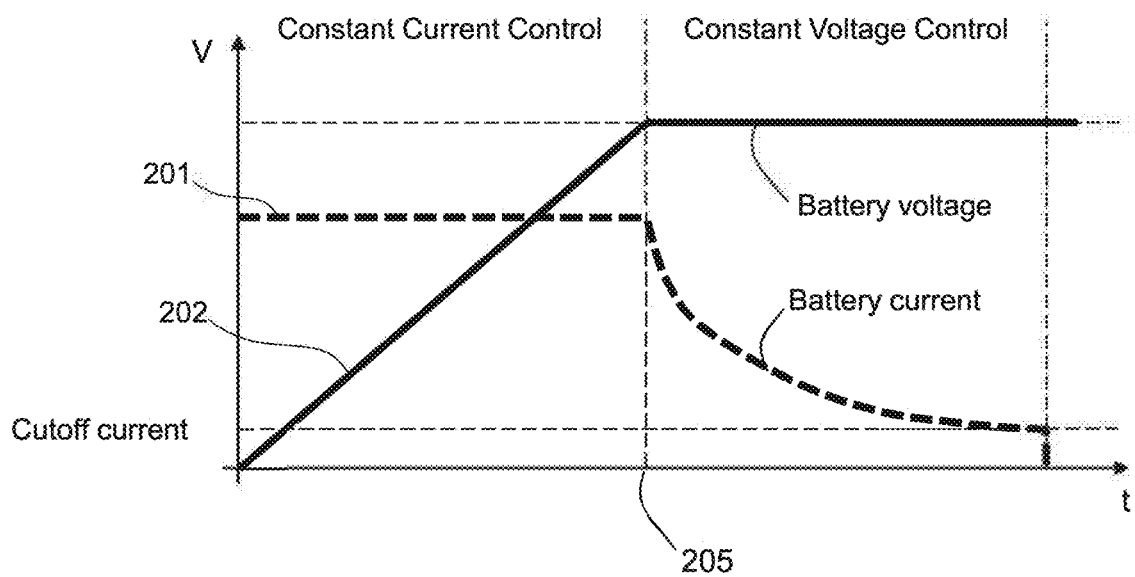
FIG. 4 shows a graph of charging an energy storage device in the form of a lithium-ion battery pack.

FIG. 4 shows a graph illustrating a charging cycle of a Li-ion battery. The graph shows battery/charging current 201 (i.e. charging current flowing into the battery) and battery voltage 202 (i.e. voltage across the terminals of the battery) over a period of time of a charging cycle. A first period of the charging cycle is a constant current control period. A second period of the charging cycle is a constant voltage control period. During the constant current control period, the charging current 201 is limited to a maximum constant value and the battery voltage 202 rises over time. At time 205, the battery voltage 202 levels off. During the constant voltage control period, the charging voltage 202 is maintained at a constant value. As the charging cycle continues, the charging current progressively falls until the battery is full at time $t_{cutoff}$.

From FIG. 4, it can be seen that the amount of energy that is accepted by the battery varies over time. This affects the amount of the input energy from the generator that can be diverted to the energy storage device 170. This affects the division of input energy between outputs 124 and 126 to achieve a desired level of exercise resistance.

Figure 5:
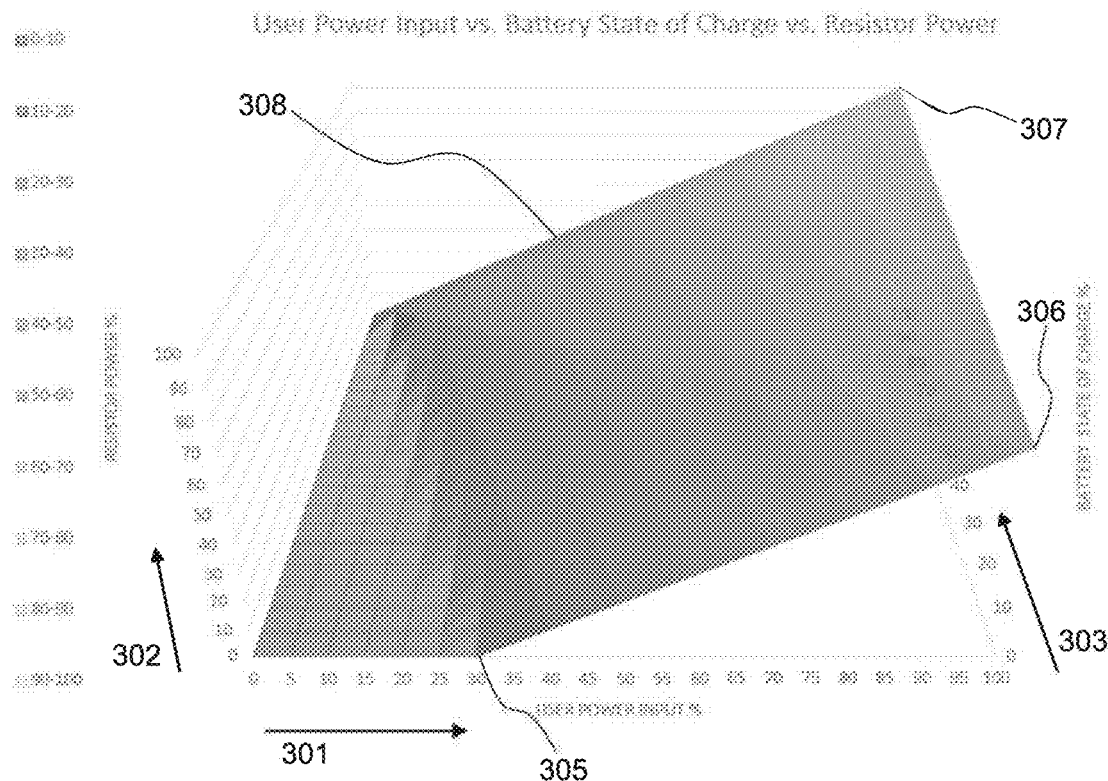
FIG. 5 shows a graph relating user input power, resistive load power and state of charge of the energy storage device.

FIG. 5 shows a three-dimensional graph of user input power (axis 301), resistive load power (axis 302) and battery state of charge (axis 303). This graph shows one possible way in which the controller distributes input energy/power from the generator between: (i) energy/power outputted to charging the battery and (ii) energy/power outputted to the resistive load to be dissipated as heat. In the illustrated example, when the battery is empty (state of charge=0%), all input energy is outputted to battery charging up to around 30% user input power. No input energy/power is outputted to the resistive load. Above 30% user input power (point 305), input energy/power is distributed between battery charging and the resistive load. It can be seen from the shape of the graph, that the portion of the input energy that is outputted to battery charging progressively decreases with increased state of charge. When the battery is full (state of charge=100%), input energy is outputted to the resistive load, and follows line 308. At point 307, user input power=100% and all of the input energy is outputted to the resistive load. It will be understood that the graph of FIG. 5 is illustrative, and that the controller 190 can be configured to distribute input energy in a different way to what is shown in this graph.

Returning to FIG. 2, the electrical system can operate with the energy storage device 170 connected to the system, or removed from the system. When the energy storage device 170 is removed from the system, all of the input energy from the generator is delivered to the resistive load regulator 140 and the resistive load 160. The resistive load 160 and the resistive load regulator 140 are configured to sink the full power demands of the exercise apparatus. An expected maximum power may be in the region of up to around 2 kW, for example during a burst of high intensity exercise. Voltage detection at output 124 can determine if the energy storage device 170 is present or removed. In some embodiments, the energy storage device 170 might receive around 0.5 kW of power for charging, whilst the resistor receives the remaining 1.5 kW, during a period of high intensity exercise when the energy storage device 170 is present.

If a voltage is detected, the controller 190 determines that the energy storage device 170 is present. Other ways of detecting presence of the energy storage device 170 include: communicating with a management system onboard the energy storage device 170; a sensor to determine the physical presence of the energy storage device 170.

The electrical system 100 can be configured to permit the energy storage device 170 to be removed or connected during exercise. This will be called hot-swapping.

The electrical system 100 has various safety measures. The controller 190 can be configured to stop charging the energy storage device 170 when a particular value of state of charge is reached. Certain battery types, such as Lithium-ion (Li-ion), perform better and retain more capacity per charging cycle when they are not charged to 100% state of charge. A user may wish to select a particular level of charge that they wish to achieve. The user interface on the exercise apparatus, where provided, or a user interface on an external device 50, can be used to select a maximum charge level. The controller 190 is configured to receive the maximum state of charge level and to stop charging the energy storage device 170 when the maximum charge level is reached.

The controller 190 is configured to check an energy storage device 170 when it is first connected to connector 155. The voltage level of the energy storage device 170 will determine its state of charge. The controller 190 can additionally 'health check' the energy storage device to show/record its degradation and estimated life-span and by performing an internal resistance check of the energy storage device 170. This is done by:
- connecting the energy storage device 170 to the resistive load 160;
- measuring battery voltage before and after current loading by shorting the battery to the resistive load 160 for a short period;
- a current measurement at 124 is used to calculate current during this loading.

The measured value of battery voltage is compared to stored data to determine battery health.

Each energy storage device 170 can include a memory which stores an identifying code. When the energy storage device 170 is connected to the connector 155 of the electrical system 100, the controller 190 can interrogate the energy storage device 170 and retrieve the identifying code. This can allow the controller 190 to determine if this particular energy storage device 170 has previously been connected to the electrical system 100. An internal resistance check is performed for new or unknown batteries. This 'health check' is performed in order to see how degraded the battery is and set a limit to how much charge it can take. By limiting the maximum charge voltage, the system can pre-emptively prolong battery capacity.

Figure 6:
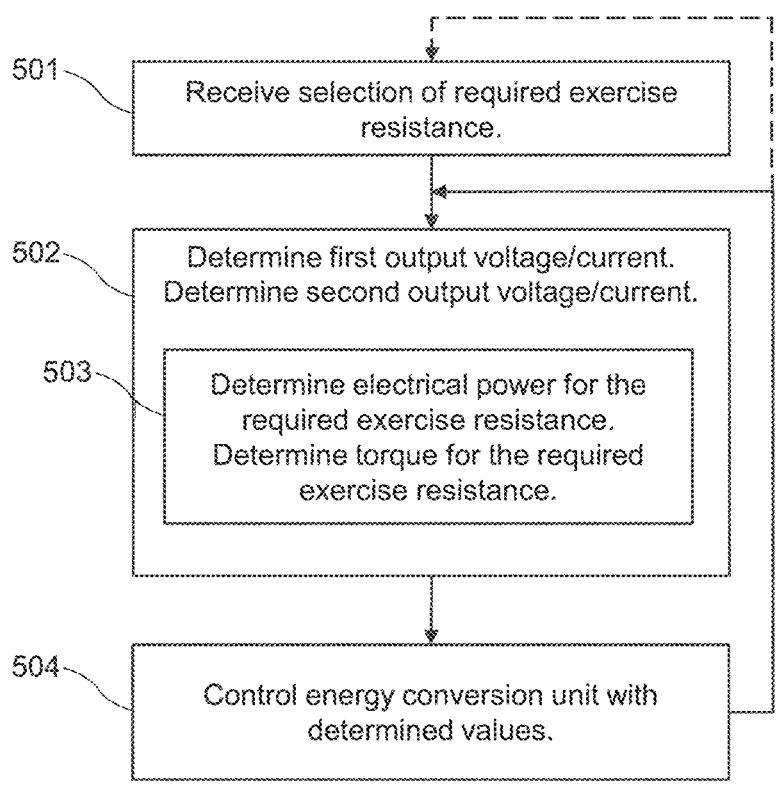
FIG. 6 shows a method of operation.

FIG. 6 shows a method of operation of the controller 190. At block 501 the method receives an input selection of exercise resistance. At block 503 the method determines a first output voltage/current for the first output of the electrical energy conversion unit and a second output voltage/current for the second output of the electrical energy conversion unit to provide the required exercise resistance. Optionally, at block 502 the method determines an electrical power for the required exercise resistance. The method may determine a torque for the required exercise resistance. At block 504 the method controls operation of the electrical energy conversion unit to output the first output voltage/current and the second output voltage/current.

Some worked examples of operation will now be provided.

Consider that a user interface provided on the bike (or an application on mobile device 50) offers the user a range of exercise resistance levels 1-10. A user selects level 5.

The controller determines that this exercise resistance level corresponds to a generator power of 500 W at a typical rate of exercise. The actual generator power will depend on the effort of the user. The controller can use data representing a typical/expected effort. The controller may also use one or more other factors such as height/weight/age of the user to adjust the generator power.

The controller determines a first output voltage/current for the first output 124 of the electrical energy conversion unit and a second output voltage/current for the second output 126 of the electrical energy conversion unit to provide the determined electrical power of 500 W. For example, the controller may operate in a mode where the input energy/power from the generator is shared between the first output 124 and the second output 126. The controller determines a duty cycle for the converter 150 to provide a required first output voltage and first output current to achieve a required dissipated power in charging the energy storage device 170. The controller determines a duty cycle for the converter 140 to provide a required second output voltage and second output current to achieve a required dissipated power in the resistive load 160. The voltage/current values can be selected based on the current state of charge of the energy storage device 170. For example, if the state of charge is low, a larger share of the input energy can be outputted to the energy storage device 170. The controller can select which mode to operate in, and how much energy/power to divert to the resistive load, based on the current state of charge of the energy storage device. Initially, when the exercise apparatus is at rest, it is only possible to estimate the expected input energy/power from the generator. Once the generator is turning, it is possible to determine the input energy/power and to determine the power that is required to be outputted.

The controller controls the energy storage regulator 150 and the resistive load regulator 140 to operate with these values of voltage and current.

The controller receives inputs from the energy conversion unit 120, including quantity (or quantities) indicative of the energy/power received from the generator, and determines operating values again.

The control loop repeats for the duration of the exercise.

In use, the resistive load 160 dissipates a large amount of energy as heat. Returning to FIG. 1, the resistive load 160 can be housed in the unit 40. The unit 40 has a housing which can dissipate the heat energy of the resistive load 160. The housing of the unit 40 can function as a heatsink for the resistive load 160. The unit 40 can include air flow inlets and air flow outlets which allow air to flow through the unit 40 to dissipate heat from the resistive load 160.

The exercise apparatus shown in FIG. 1 is an exercise bike with a flywheel and a generator coupled to the flywheel. The exercise apparatus can take other forms. For example:
  rowing machine: rowing machines typically use a fan to provide air resistance. An electrical generator (and flywheel) can replace the fan, with user effort being transferred to the generator (and flywheel).
  weightlifting machine: an electrical generator can be coupled to moving components of the machine (e.g. pulley, cables),
  treadmill, skiing cardio machine, stair climbing machine or cross-training machine, elliptical trainer, elliptical arm ergometer.

As noted above, it is to be understood that the exercise apparatus may be provided in any suitable form of kinetic cardio or strength workout apparatus in which user movement is employed to drive the generator.

Figure 7:
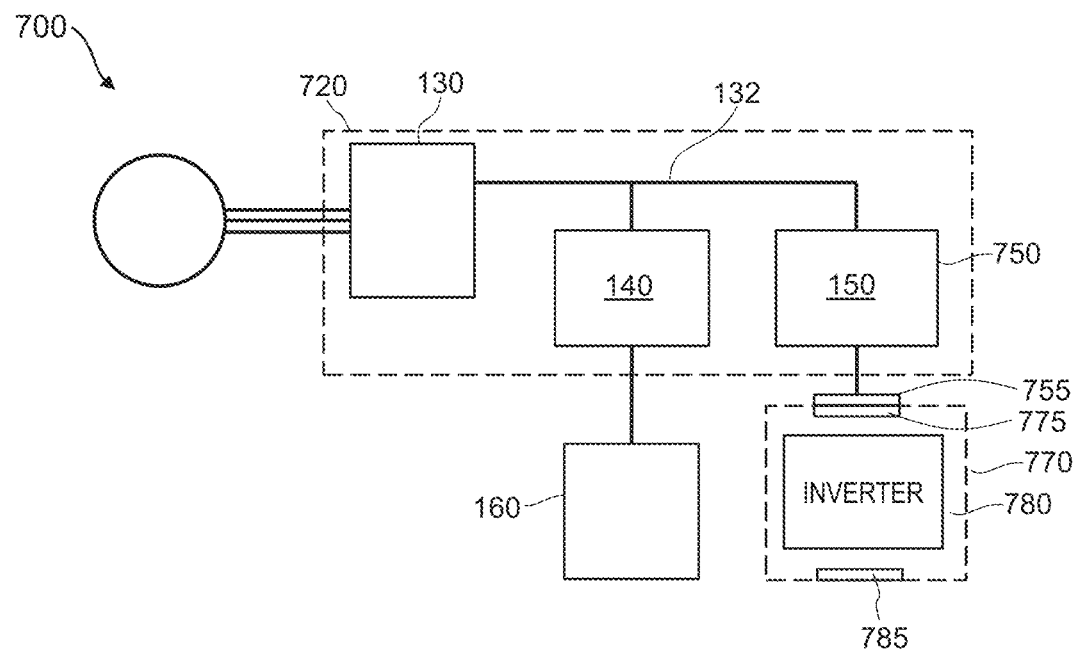
FIGS. 7 and 8 show an electrical system with an inverter.

In the electrical system 100 of FIG. 2, an electrical storage device 170 is connectable to the connector 155. FIG. 7 shows another electrical system 700 which can be used in the exercise apparatus 100. The electrical system 700 has an energy conversion unit 720 with an output port 755 for connecting to an inverter unit 770. The inverter can be housed in a housing with a connector 775 which is the same, or similar, as connector 155, FIG. 2. The inverter unit 770 comprises an inverter which can convert a DC supply, received via the connector 775, to an AC output supply, such as a mains voltage AC supply. The inverter unit 770 is removable from the electrical system 700 by disconnecting connector 775 from port 755. The inverter unit 770 can be fitted in place of the energy storage device 170. A regulator 750 converts a bus voltage to an output voltage for outputting to the inverter unit 770. The regulator 750 may be the same as energy storage regulator 150, or modified to provide a suitable supply to the inverter unit 770. The inverter unit 770 has an output port 785 which can be connected to an electrical load, such as an electrical appliance.

It is to be understood that, in some embodiments the inverter unit 770 may be operable automatically to electrically disconnect the inverter unit 770 from the exercise apparatus 100, for example in the event that a fault is detected. For example, if the inverter unit 770 detects a fault with the inverter unit 770, for example a fault preventing correct operation of the inverter unit 770, the inverter unit 770 may automatically disconnect from the exercise apparatus 100 such that electrical power for conversion by the inverter unit 770 to output electrical power to power an external load via output port 785 can no longer be received by the inverter unit 770. In some embodiments, the inverter unit 770 may similarly disconnect itself from the exercise apparatus 100 in the event that a fault is detected with the exercise apparatus 100. It is to be understood that, in the event that the inverter unit 770 is not connected to the exercise apparatus 100, either due to lack of a physical connection or due to the inverter unit 770 automatically electrically disconnecting itself from the exercise apparatus 100 such that electrical power for conversion by the inverter can no longer be received by the inverter unit 770, the exercise apparatus 100 may operate in the third mode (MODE 3) if it is not already doing so.

In some embodiments, the exercise apparatus 100 may be arranged to operate in the third mode (MODE 3) in the event that the inverter unit 770 is connected to the exercise apparatus 100 but the inverter unit 770 is not drawing power from the exercise apparatus 100. In some embodiments, the inverter unit 770 may be arranged not to draw power from the exercise apparatus 100 if the output port 785 of the inverter unit 770 is not connected to an external load. In some embodiments, the inverter unit 770 may be arranged not to draw power from the exercise apparatus 100 if the inverter unit 770 is connected to an external load but the external load is not drawing power from the inverter unit 770. Other arrangements may be useful in some embodiments.

The inverter unit 770 may be arranged to be connected to a mains power supply of a building such as a ring main of the building. Thus, the inverter unit 770 may be arranged to be grid-tied, outputting electrical energy at a frequency and phase synchronised with that of the building supply.

Figure 8:
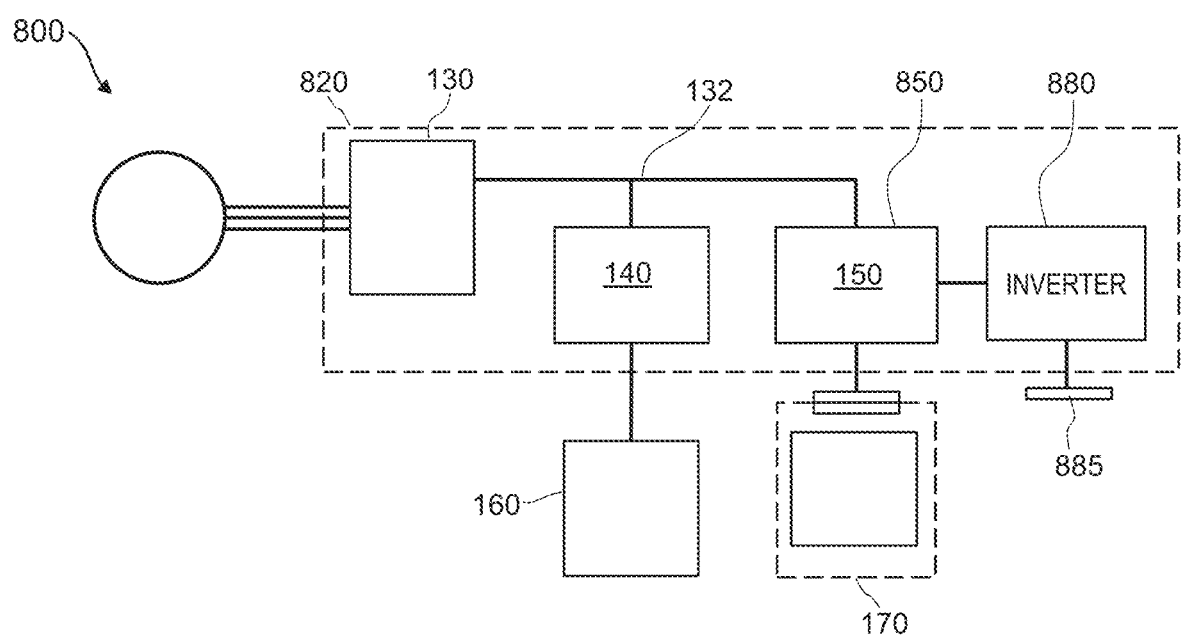

FIG. 8 shows another electrical system 800 which can be used in the exercise apparatus 100. The electrical system 800 also has an inverter 880. In this system, inverter 880 is provided as part of energy conversion unit 820. The inverter has an output port 885 for connecting to an electrical load, such as an electrical appliance. The output port 885 can be a conventional mains voltage socket. The inverter 885 can convert a DC supply, received from rectifier/boost unit 130, to an AC output supply. Regulator 850 may be the same as energy storage regulator 150, and provides a suitable DC supply to the inverter 880. The electrical system 800 has the capability of: (i) charging the energy storage device 170 and outputting energy/power to the inverter 880; (ii) only charging the energy storage device 170; (iii) only outputting energy/power to the inverter 880.

In a similar manner to the inverter unit 770 of FIG. 7, the inverter 880 may be arranged to be connected to a mains power supply of a building such as a ring main of the building. Thus, the inverter 880 may be arranged to be grid-tied, outputting electrical energy at a frequency and phase synchronised with that of the building supply. In some embodiments the electrical system 800 may be operable automatically to electrically disconnect the inverter 880 from the system energy conversion unit 820, for example in the event of a fault with the inverter 880 or a device or system to which the inverter 880 may be connected via output port 885.

Figure 9:
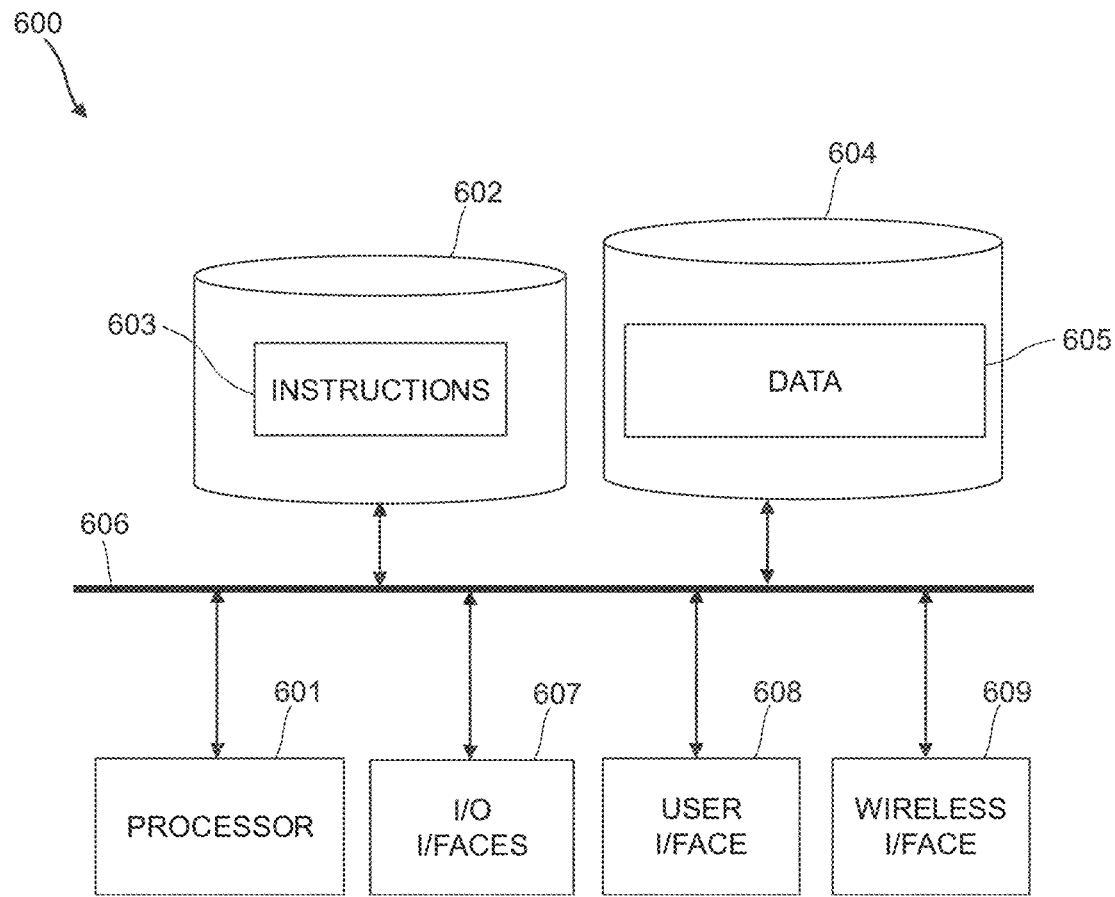
FIG. 9 shows a processing apparatus for implementing the method of FIG. 6.

FIG. 9 shows an example of a controller 600 which may implement the controller 190, FIG. 2. The controller 600 may implement all, or part of, the method of FIG. 6. Controller 600 comprises one or more processors 601 which may be any type of processor for executing instructions to control the operation of the device. The processor 601 is connected to other components of the device via one or more buses 606. Processor-executable instructions 603 may be provided using any data storage device or computer-readable media, such as memory 602. The processor-executable instructions 603 comprise instructions for implementing the functionality of the described methods. The memory 602 is of any suitable type such as non-volatile memory, a magnetic or optical storage device. Data 605 may be stored in memory/storage device 604, or in memory/storage device 602. The processing apparatus 600 comprises input/output (I/O) interfaces 607. The I/O interfaces 607 can receive signals from the electrical system 100, such as the measured voltages and currents of the energy conversion unit 120. When a user interface 608 is provided on the bike the processing apparatus 600 connects to it. The processing apparatus 600 connects to a wireless interface 609 for wirelessly interfacing with other apparatus. The wireless interface 609 can implement a short range wireless technology, such as Bluetooth™, a wireless local area networking technology such as IEEE 802.11 (WiFi™), or some other wireless technology. The interface 609 may be a non-wireless interface such as a CAN bus interface or ethernet in some embodiments.

The bike 10 may also be provided with an emergency brake. The emergency brake can be a friction brake which can quickly bring the flywheel to a stop. The emergency brake is not the means by which the bike normally provides resistance to user effort.

A possible alternative is to replace, or supplement, the resistive load 160 with an inverter, or an output port for connection to an inverter. The inverter can be connected to an electrical load (such as an electrical appliance) or a ring-main.

As noted above, in some embodiments the exercise apparatus may allow a user to set a torque resistance of the generator by means of the user interface. The apparatus may allow a user to set the torque resistance by means of a remote device such as a smartphone, optionally in wireless communication with the controller. By maintaining a given torque resistance to rotation of the generator, the exercise apparatus is able to provide the user with a consistent feel to the apparatus, that is the user experiences an expected exercise resistance, such as rotation of pedals 22 in the case of the bike 10 of FIG. 1, regardless of the state of charge of the energy storage device 170 and whether or not the energy storage device 170 is connected.

In some embodiments, the controller may be configured to vary the amount of torque resistance according to a predetermined or stored torque resistance exercise profile that defines a torque resistance to be generated by the apparatus as a function of time or 'effective' or 'virtual' distance travelled. The effective distance travelled may be calculated based at least in part on the speed at which the generator is being turned by a user. The effective distance travelled may be calculated based on generator speed, elapsed time and a ratio between generator speed and 'effective' or 'virtual' speed of travel of the user. This ratio may be considered to be an effective gear ratio.

Optionally, the profile may be arranged to simulate travel over terrain with upwardly and/or downwardly inclined slopes. This may provide the user with an immersive exercise experience, enhancing user enjoyment of the apparatus. In some embodiments, the controller may be configured to receive information indicative of a user-selected one of a plurality of predetermined profiles stored by the controller, for example by means of a touchscreen associated with the user interface, or from a remote device such as a user's smartphone. Alternatively, or in addition, the controller may be configured to receive information defining a torque resistance exercise profile and comprising torque resistance information as a function of time or effective distance travelled. The information may be received from the user interface, where provided on the bike, or from a remote device.

Optionally, the apparatus 10 may be configured to allow a user to set a desired power level that the user desires to generate. The apparatus 10 may then vary the amount of torque resistance applied by the generator 110 in order to cause a user to generate the desired power for a given speed of rotation of the generator 110 by the user. This may be referred to as an 'ergo mode'. Thus a user may set a power level such as 100 W, 200 W, 500 W or any other suitable power level.

In some embodiments, a remote device such as a user's smartphone may monitor exercise burn for that user during the course of a given period such as during the course of a day and output to the controller an amount of energy burned so far in that period. The user may input to the controller a target energy burn for that period, e.g. via the remote device, such as a daily target energy burn. This may be a one-time input when (say) registering with software associated with the controller. The target energy burn, such as target daily energy burn, may be updated by a user as required. The controller may calculate a target energy burn for a given period of exercise using the exercise apparatus based on the target energy burn for the day and the amount of energy burned already that day (e.g. based on the information received from the user's smartphone), for example by subtracting the amount of energy burned from the target amount to be burned.

The controller may then select or otherwise define a torque resistance exercise profile or 'exercise resistance profile' arranged to ensure that the user burns the target amount of energy. The controller may also ask a user to input an amount of time available for the exercise period and tailor the exercise profile to ensure that the required amount of energy is burned in the available time.

As noted above, the remote device may be a smartphone or other device carried by a user. It may be configured and arranged to estimate an amount of energy burned by a user at a given moment in time during the course of day, such as during periods of walking, running and/or resting. It may receive input from an external biometric monitor such as a heart monitor. The remote device may comprise a motion sensor arranged to estimate energy burn based at least in part on motion of the remote device, which may be carried or worn by a user. As noted above the remote device may use the estimate of the amount of energy burned in order to determine the target amount of energy to be burned during a period of exercise.

It is to be understood that remote control of torque resistance by means of a remote device such as a user's phone may allow integration of the exercise apparatus with third party software applications such as multiplayer games, where torque resistance may be controlled by the third party software in communication with the controller.

In some embodiments the apparatus may be arranged to power an electrical appliance directly, such as a fan. The apparatus may be arranged to control the appliance in dependence on the amount of power a user is developing. Thus, in some embodiments the apparatus may cause a fan to blow air at a higher rate when a user develops a higher amount of electrical power. This may be helpful in providing enhanced cooling to a user. The rate of blowing of air may be configured to correspond to a virtual speed of travel of the user, being an effective speed based for example on an amount of power being generated by the user.

In some embodiments the apparatus may be configured to draw power to power the generator as a motor, for example to simulate downhill cycling. The power may be drawn from the battery 170 in some embodiments. In some embodiments the power may be drawn from an external power source such as a mains supply.

In some embodiments the apparatus may be operable to allow charging of a battery connectable to the apparatus such as battery 170 and in addition a further battery such as a user's tablet or smartphone battery.

In some embodiments, if an amount of power developed by a user reaches a threshold level, the apparatus may attempt to prevent a user from exceeding the threshold power level by reducing the amount of resistance provided by the generator, this may be referred to as 'resistance drop off' and effectively provides a 'power ceiling' for the apparatus. In some embodiments a user can set a value of power ceiling. This feature may allow a user to avoid over working of muscles for example and/or achieve a consistent level of exertion during the course of an exercise period.

In some embodiments the apparatus may provide an output indicative of an amount of power generated by a user at a given moment in time. Thus, in some embodiments the apparatus may provide a real-time 'power meter'. The power indication may be provided in the form of a digital readout such as a numerical display, a bar graph display, a colour of an output indication or any other suitable means.

In some embodiments a variable fin or other appendage may be attached to the flywheel or other rotating component in order to direct airflow to cool electrical circuitry of the apparatus and/or a user.

In some embodiments heat generated by the apparatus may be used to generate electricity, for example by means of a Peltier device, in order to charge the battery 170 or drive one or more other components or appliances.

In some embodiments the removable battery pack 170 has a power storage capacity of around 100 Wh (Watt hours). Other capacities may be useful in some embodiments. In the example shown, the battery pack has 10 battery cells of the 18650 type, each having a capacity of 8800 mAh and an output potential of around 3.7V. In some examples the cells may have an output potential in the range from around 2.5V to around 4.2V. The cells may be charged at a potential of up to around 4.2V. Accordingly, if the cells are connected in series within a casing of the pack 170, the cells may be charged at a potential of up to around 42V.

Figure 10:
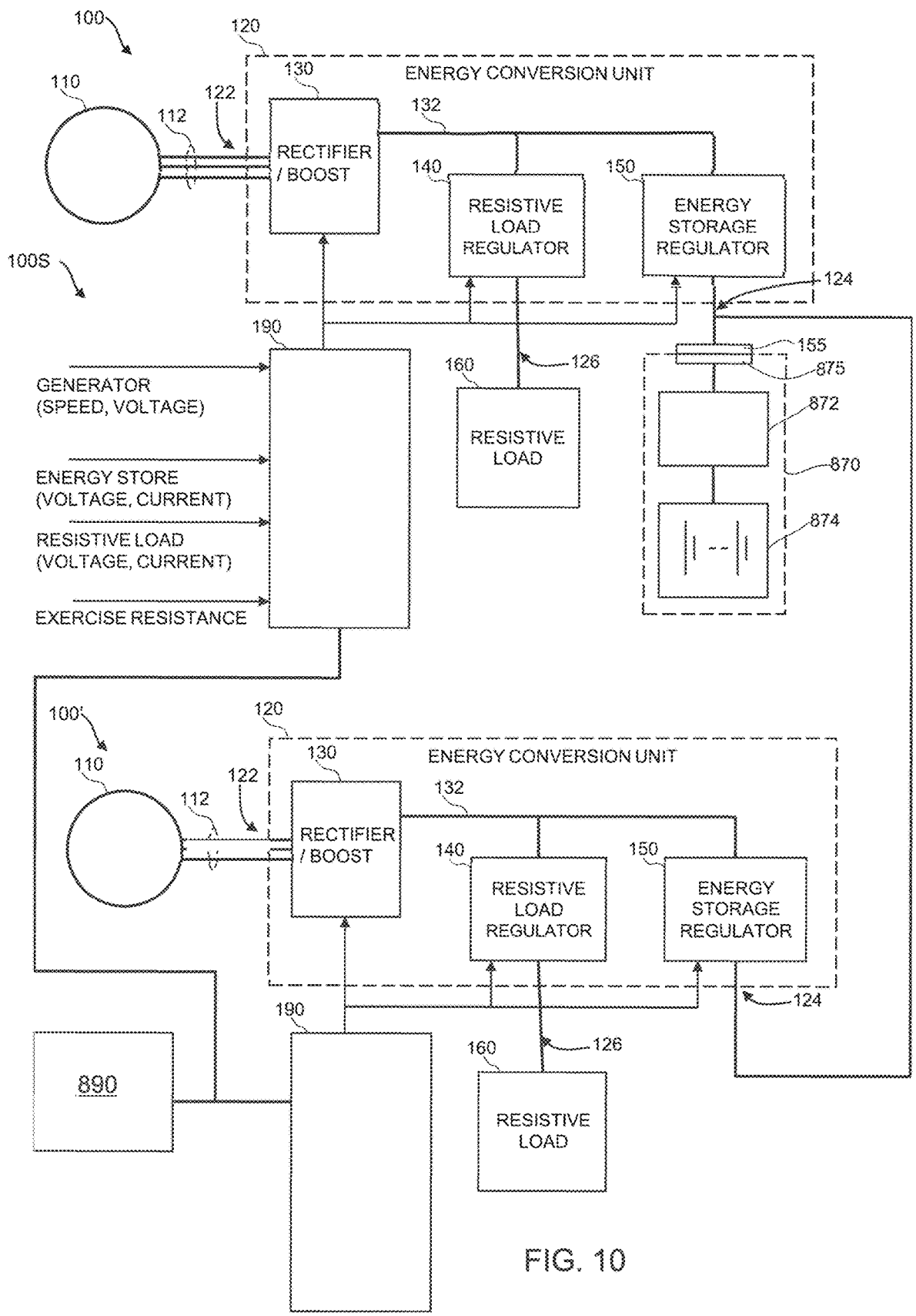
FIG. 10 shows a plurality of exercise apparatus according to an embodiment of the invention coupled to a common energy storage device and an external controller.

FIG. 10 shows an example of an embodiment in which two exercise apparatus 100, 100' of the kind shown in FIG. 1 and FIG. 2 are connected in parallel to a common energy storage device 870 instead of to a portable energy storage device 170. In some embodiments one or more of the exercise apparatuses 100 connected to the common energy storage device 870 may also be provided with a connector for connecting a portable energy storage device 170, optionally they may be provided with a holder such as a cradle 170C for holding the portable energy storage device 170 as in the embodiment shown in FIG. 1. The exercise apparatus 100 may be configured to supply electrical power generated by a user to the common energy storage device 870. In the event that a portable energy storage device 170 is connected to an individual apparatus 100, 100' in addition, the apparatus 100, 100' may be configured to prioritise charging of the portable energy storage device 170 over charging of the common energy storage device 870. Alternatively in some embodiments charging of the common energy storage device 870 may be prioritised.

In the embodiment shown the common energy storage device 870 is a storage device of greater capacity than the removable portable storage device 170. In the embodiment shown, the energy storage device 870 has an electrical charging port 875 that is connected to electrical output port 155 of each of the exercise apparatus 100, 100'. The energy storage device 870 has a battery management unit or system (BMS) 872 that manages charging of cells 874 of the energy storage device 870. In the embodiment shown the output ports 155 of the exercise apparatuses 100, 100' are connected in parallel to the common energy storage device 870.

In an embodiment, the common energy storage device 870 has a storage capacity of around 10000 Wh (Watt hours). In some embodiments the storage capacity may be around 25,000 Wh (Watt hours) or greater. The storage capacity may be lower or higher depending on the number of apparatuses 100, 100' connected to the energy storage device 870.

The common energy storage device 870 may be a portable energy storage device 870 in some embodiments. Alternatively, it may be a non-portable storage device 870 as in the embodiment of FIG. 10. The common energy storage device 870 may be arranged to provide power to an operational environment in which the exercise apparatuses 100, 100' are operating such as a gym or other environment. It may for example power lighting associated with the environment and/or other electrical loads such as a ventilation system. It is to be understood that in some embodiments the common energy storage device 870 may be arranged to provide power to a mains power supply of a building, such as a ring main of the building via a grid-tied electrical inverter. The storage device 870 thereby acts as a power buffer. Optionally, the grid-tied electrical inverter may be arranged to deliver power to the building at certain times, such as when an electrical usage tariff charged by a utility provider is higher.

The grid-tied electrical inverter may be connected to a mains distribution board of a building in some embodiments.

It is to be understood that the energy storage device 870 may be configured automatically to electrically disconnect itself from the exercise apparatuses 100, 100' connected thereto in the event of a fault. In the event that the energy storage device 870 becomes disconnected and a removable portable storage device 170 is not connected to the apparatus 100, 100', the exercise apparatus 100, 100' is configured to operate in the third mode (MODE 3) in the manner described above in which power generated by the apparatus 100, 100' is dissipated in the resistive load 160 associated with the respective apparatus 100, 100'. Thus, in the event of a fault whilst one or both of the exercise apparatuses 100, 100' are generating power, the one or more exercise apparatus units 100, 100' operate in the third mode (MODE 3) depending on whether a removable portable storage device 170 is connected to a given apparatus 100, 100' and requires to receive electrical energy. If a removable portable storage device 170 is connected to a given apparatus 100, 100' that requires to receive electrical energy, the apparatus 100, 100' operates in the second mode (MODE 2) as described above.

It is to be understood that the exercise apparatus 100, 100' may also operate in the third mode (MODE 3) if it is determined that the common energy storage device 870 can no longer receive charge, in the case that no removable storage device 170 is connected, or a removable storage device 170 is connected but which also can no longer receive charge, for example because its state of charge has reached a maximum allowable level.

Accordingly, embodiments of the present invention allow users of respective apparatus 100, 100' to enjoy a consistent feel to the apparatus 100, 100' according to the exercise resistance to which the apparatus 100, 100' has been set regardless of whether the apparatus 100, 100' is connected to one, both or none of the common energy storage device 870 or a respective portable storage device 170, and regardless of the state of charge of those one or more devices 870, 170.

In the embodiment of FIG. 10, each of the apparatuses 100, 100' are connected to a central or common controller 890 external to the apparatuses 100, 100' that communicates with the respective onboard controllers 190 of the apparatuses 100, 100'. The common controller 890 is provided in the form of a computing apparatus, in the present embodiment a laptop computing device 890. It is to be understood that, in some alternative embodiments, other forms of computing apparatus 890 may be employed such as a desktop computing device, tablet device, cloud-based apparatus/device or any other suitable form of computing apparatus. It is to be understood that by central or common controller 890 is meant a controller 890 that is configured to communicate with each exercise apparatus 100, 100' connected thereto (whether by wired connection or wireless connection) in order to assert control over one or more aspects of operation of the apparatus 100, 100', such as exercise resistance, as opposed to a physical location of the controller 890, which need not be physically central.

In some embodiments, the common controller 890 may be configured to communicate with the controller 190 associated with each of the exercise apparatus units 100, 100' and instruct one or more of the apparatuses 100, 100' to operate in the third mode (MODE 3) wherein electrical power generated by one or more of the apparatuses 100, 100' is dissipated in the load 160 associated with the apparatus 100, 100' and not output to the common energy storage device 890 or a portable battery 170 if connected to the apparatus 100, 100'. This may be useful, for example, in the event the controller 890 determines that the common energy storage device 870 has reached a desired level of charge or the controller 890 detects a fault associated with the system 100S such as the common energy storage device 870. By commanding operation in MODE 3 the controller 890 may thereby provide an additional level of protection to the system 100S in addition to the functionality of the controller 190 and energy conversion unit 120 of each of the apparatuses 100, 100' in causing the apparatus 100, 100' to operate in MODE 3 as described above and illustrated for example with respect to FIG. 3.

In the embodiment of FIG. 10 the controller 890 is operable by an operator to communicate with the controller 190 associated with each of the exercise apparatus units 100, 100' and provide instructions to the controllers 190 to set the exercise resistance of each apparatus 100, 100' to a desired value. It is to be understood that the operator of the central controller 890 may be a fitness instructor or a coach or other operator. The controller may be configured to permit the operator to set the exercise resistance of each apparatus 100, 100' to a respective value individually such that one apparatus 100 may have a different resistance value set by the operator compared with another apparatus 100'.

The controller 890 may permit the operator to run a pre-set routine in which the computing apparatus 890 causes the exercise resistance of each apparatus 100, 100' to change as a function of time in order to provide a desired exercise profile for the users of the apparatus 100, 100' under the control of the computing apparatus 890. The controller 890 may be configured whereby different exercise profiles may be provided to respective apparatuses 100, 100' in some embodiments. In some embodiments the controller 890 may be configured whereby substantially the same exercise profile may be provided to a plurality of the apparatus 100, 100' substantially simultaneously.

In addition or instead, in some embodiments the controller 890 may be configured to provide substantially the same command in terms of required exercise resistance to each user such that they experience substantially the same exercise resistance as other users. The command may be provided in the form of a command to the controllers 190 to increase or decrease exercise resistance by a defined amount such as 5%, 10% or any suitable amount. The increase may be a proportion of the currently set amount, or a proportion of the maximum amount of exercise resistance that may be set. Alternatively, the central computing apparatus 890 may send a command indicating the value of exercise resistance to be set, rather than the size or proportion of an increase or decrease.

In some embodiments, a user of a given exercise apparatus 100, 100' may be permitted to vary the exercise resistance to which their apparatus 100, 100' is set by introducing a resistance offset with respect to the resistance value that the central controller 890 has indicated should be set.

This exercise resistance offset may be implemented by the controller 190 of each apparatus 100, 100' by applying the offset (increase or decrease in resistance) to the value of desired exercise resistance received from the central controller 890. Alternatively, the controller 190 may transmit to the central controller 890 the desired value of offset a user has requested. The central controller 890 may then send a revised value of required exercise resistance to the controller of the exercise apparatus 190 taking into account the user's requested offset. Thus, if a user requests that exercise resistance is reduced by a given amount, the central controller 890 may send a value of required exercise resistance to the controller 190 of that user's apparatus 100, 100' causing the apparatus 100, 100' to reduce the exercise resistance accordingly. In some embodiments the operator of the central controller 890 may be permitted to override a user's request and ignore the user's request to change the value of exercise resistance that the user is experiencing.

It is to be understood that the central controller 890 may be arranged to control any desired number of individual units of exercise apparatus 100 such as that illustrated in FIG. 1. It is to be understood that one group of a plurality of units of exercise apparatus 100 under the control of the controller 890 may be connected to one common energy storage device 870 whilst another group of a plurality of units of exercise apparatus 100 under the control of the controller 890 may be connected to a different common energy storage device 870.

In some embodiments up to ten or more exercise apparatus units 100 may be connected to a common energy storage device 870.

In some embodiments up to twenty or more exercise apparatus units 100 may be connected to a common energy storage device 870.

In some embodiments where a plurality of exercise apparatus units 100 are connected to a common energy storage device 870, controller 890 may be omitted.

Other arrangements may be useful in some embodiments.

Throughout the description of this specification, the words "comprise" and "contain" and variations of the words, for example "comprising" and "comprises", means "including but not limited to", and is not intended to (and does not) exclude other moieties, additives, components, integers or steps.

Throughout the description of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An exercise apparatus comprising:
   an electrical generator which is configured to be driven by user effort;
   an electrical output port configured to electrically connect to an electrical storage device or an inverter;
   an electrical resistive load;
   an electrical energy conversion unit comprising:
      an input connected to the electrical generator and configured to receive electrical energy from the electrical generator;
      a first output connected to the electrical output port; and
      a second output connected to the electrical load;
   a controller which is configured to:
      receive an input selection of a required exercise resistance;
      determine a first output voltage/current for the first output of the electrical energy conversion unit and a second output voltage/current for the second output of the electrical energy conversion unit to provide the required exercise resistance; and
      control operation of the electrical energy conversion unit to output the first output voltage/current and the second output voltage/current,
   wherein the controller is configured to operate in three operating modes:
      (i) a first operating mode in which input energy from the generator is only output to the first output;
      (ii) a second operating mode in which input energy from the generator is output to a combination of the first output and the second output;
      (iii) a third operating mode in which input energy from the generator is only output to the second output,
   wherein the electrical storage device or inverter is selectively connectable to the electrical output port and the controller is configured to:
      determine when the electrical storage device or inverter is connected to the electrical output port; and
      when the electrical storage device or inverter is not connected to the electrical output port, operate in the third operating mode.

2. The exercise apparatus according to claim 1, wherein the electrical storage device or inverter is selectively connectable to the electrical output port while the exercise apparatus is in use.

3. The exercise apparatus according to claim 1, wherein the electrical output port is configured to electrically connect to an electrical storage device, and wherein the controller is configured to determine a state of charge of the electrical storage device and to vary the first output voltage/current and the second output voltage/current over time based on a state of charge of the electrical storage device.

4. The exercise apparatus according to claim 3, wherein the controller is configured to selectively control the first output voltage/current according to one of: a constant current charging scheme and a constant voltage charging scheme based on a state of charge of the electrical storage device.

5. The exercise apparatus according to claim 3, wherein the controller is configured to determine a state of charge of the electrical storage device by monitoring battery voltage.

6. The exercise apparatus according to claim 1, wherein the controller is configured to determine an electrical power corresponding to the exercise resistance.

7. The exercise apparatus according to claim 1, wherein the controller is configured to determine a required torque based on the required exercise resistance.

8. The exercise apparatus according to claim 1, wherein the controller is configured to prioritise transfer of input energy from the generator to the first output.

9. The exercise apparatus according to claim 1, wherein the controller is configured to determine an electrical power corresponding to the exercise resistance based on an input which is indicative of an actual operation of the electrical generator.

10. The exercise apparatus according to claim 9, wherein the input which is indicative of the actual operation of the electrical generator is at least one of:
   an output voltage of the generator;
   a voltage within the energy conversion unit which is related to an output voltage of the generator; and
   rotational speed of the generator.

11. The exercise apparatus according to claim 1, wherein the electrical energy conversion unit comprises:
   a first converter configured to rectify an alternating current output of the generator to a direct current output at a higher output voltage;
   a second converter configured to derive the first output voltage from the direct current output voltage of the first converter; and a third converter configured to derive the second output voltage from the direct current output voltage of the first converter.

12. The exercise apparatus according to claim 1, wherein the electrical generator is a brushless DC motor which provides a three-phase alternating current supply.

13. The exercise apparatus according to claim 1, further comprising a user interface and wherein the controller is configured to receive an input selection of exercise resistance from the user interface, or the controller is configured to determine a required exercise resistance from one or more inputs from the user interface.

14. The exercise apparatus according to claim 1, further comprising a wireless communications interface and wherein the controller is configured to receive an input selection of exercise resistance from the wireless communications interface, or the controller is configured to determine a required exercise resistance from data received from the wireless communications interface.

15. The exercise apparatus according to claim 14, wherein the controller is configured to receive energy burned information indicative of an amount of energy a user has expended in a given period of time, optionally during the course of the current day, the controller being further configured to receive target energy burn information indicative of a target amount of energy to be expended by a user in a corresponding period, the controller being configured to calculate a target amount of energy to be burned during a period of exercise using the exercise apparatus.

16. The exercise apparatus according to claim 15, wherein the controller is configured to receive information indicative of the amount of time available to the user to burn the target amount of energy and to generate exercise profile information corresponding to a variation of required exercise resistance provided by the generator as a function of at least one selected from amongst time or effective distance travelled.

17. The exercise apparatus according to claim 16, wherein the controller is configured to communicate with a remote device such as a user's smartphone in order to receive the energy burned information.

18. The exercise apparatus according to claim 1, wherein the exercise apparatus is in the form of: a bike; a rowing machine; a cross-training machine, a weightlifting apparatus, a skiing cardio machine, a treadmill, a stair climbing machine, an elliptical trainer or an elliptical arm ergometer.

19. A method of controlling an exercise apparatus comprising an electrical generator which is configured to be driven by user effort, an electrical output port for electrically connecting to an electrical storage device or an inverter, an electrical resistive load and an electrical energy conversion unit, the method comprising:
receiving an input selection of exercise resistance;
determining a first output voltage/current for a first output of the electrical energy conversion unit connected to the electrical output port and a second output voltage/current for the electrical resistive load to provide the required exercise resistance; and
controlling operation of the electrical energy conversion unit to output the first output voltage/current and the second output voltage/current,
operating in three operating modes:
(i) a first operating mode in which input energy from the generator is only output to the first output;
(ii) a second operating mode in which input energy from the generator is output to a combination of the first output and the second output; and
(iii) a third operating mode in which input energy from the generator is only output to the second output,
wherein the electrical storage device or inverter is selectively connectable to the electrical output port and the method comprises determining when the electrical storage device or inverter is connected to the electrical output port; and when the electrical storage device or inverter is not connected to the electrical output port, operating in the third operating mode.

20. A computer program comprising instructions which, when the program is executed by a computer, cause the computer to carry out the method of claim 19.

21. A computer-readable medium having stored thereon the computer program of claim 20.

22. An electrical energy conversion unit for use with an exercise apparatus with an electrical generator and an electrical load, the electrical energy conversion unit comprising:
an input configured to connect to the electrical generator and configured to receive electrical energy from the electrical generator;
a first output connected to an electrical output port which is configured to electrically connect to an electrical storage device or an inverter; and
a second output which is configured to electrically connect to an electrical load;
a controller which is configured to:
receive an input selection of a required exercise resistance;
determine a first output voltage/current for the first output of the electrical energy conversion unit and a second output voltage/current for the second output of the electrical energy conversion unit to provide the required exercise resistance; and
control operation of the electrical energy conversion unit to output the first output voltage/current and the second output voltage/current,
wherein the controller is configured to operate in three operating modes:
(i) a first operating mode in which input energy from the generator is only output to the first output;
(ii) a second operating mode in which input energy from the generator is output to a combination of the first output and the second output; and
(iii) a third operating mode in which input energy from the generator is only output to the second output,
wherein the electrical storage device or inverter is selectively connectable to the electrical output port and the controller is configured to:
determine when the electrical storage device or inverter is connected to the electrical output port; and
when the electrical storage device or inverter is not connected to the electrical output port, operate in the third operating mode.

* * * * *